(12) United States Patent
Gore

(10) Patent No.: US 7,070,824 B1
(45) Date of Patent: Jul. 4, 2006

(54) APPARATUS AND METHODS FOR PROCESSING MEAT

(75) Inventor: Richard E. Gore, Orange, CA (US)

(73) Assignee: Honey Baked Ham, Inc., Irvine, CA (US)

( * ) Notice: Subject to any disclaimer, the term of this patent is extended or adjusted under 35 U.S.C. 154(b) by 0 days.

(21) Appl. No.: 11/091,318

(22) Filed: Mar. 28, 2005

(51) Int. Cl.
A23L 1/317 (2006.01)

(52) U.S. Cl. .................. 426/518; 426/302; 426/83; 99/516; 99/534

(58) Field of Classification Search ............... 426/518, 426/302; 99/345, 535, 534, 516; 83/22, 83/169, 932, 733
See application file for complete search history.

(56) References Cited

U.S. PATENT DOCUMENTS

| | | | |
|---|---|---|---|
| 3,149,554 A | 9/1964 | Greenspan | |
| 3,153,436 A * | 10/1964 | Chesley | 99/538 |
| 3,719,504 A * | 3/1973 | Greenspan et al. | 99/353 |
| 4,050,370 A | 9/1977 | Schmidt et al. | |
| 4,170,174 A | 10/1979 | Ditty et al. | |
| 4,313,963 A | 2/1982 | Greenspan | |
| 4,386,560 A | 6/1983 | Ditty | |
| 4,441,411 A | 4/1984 | Mullins, Jr. | |
| 4,549,478 A | 10/1985 | Entes | |
| 4,590,829 A | 5/1986 | Davidson et al. | |
| 4,817,479 A * | 4/1989 | Perrine | 83/169 |
| 4,913,044 A | 4/1990 | Heath | |
| 5,097,755 A | 3/1992 | Hill | |
| 5,168,784 A | 12/1992 | Foster et al. | |
| 6,413,566 B1 | 7/2002 | Caridis et al. | |
| 6,513,450 B1 | 2/2003 | Gore et al. | |
| 6,558,725 B1 | 5/2003 | Giraldo et al. | |
| 6,805,747 B1 | 10/2004 | Gore et al. | |

* cited by examiner

Primary Examiner—Milton I. Cano
Assistant Examiner—Adepeju O. Pearse
(74) Attorney, Agent, or Firm—Knobbe, Martens, Olson & Bear, LLP (57) ABSTRACT

Apparatus and methods for slicing and seasoning meat, such as a ham. In one example, the apparatus includes a blade for slicing meat and a sprayer, such as a nozzle, for providing a stream of liquid seasoning in the direction of the blade during slicing, such that the liquid seasoning is distributed in between each slice substantially throughout the cut of meat. The sprayer may be coupled to a domestic water supply and/or at least one reservoir for holding a liquid seasoning. The apparatus may further include a spiral slicing configuration such that the meat is rotated while it is sliced and seasoned. Angling the blade with respect to the meat advantageously provides an opening in the meat so liquid seasoning may be distributed therein during the slicing process. In other examples, multiple sprayers and/or blades may be used.

23 Claims, 5 Drawing Sheets

APPARATUS AND METHODS FOR PROCESSING MEAT

BACKGROUND OF THE INVENTION

1. Field of the Invention

Preferred embodiments of the invention relate to processing meat and, in particular, apparatus and methods for slicing and seasoning meat.

2. Description of the Related Art

Meats often undergo extensive preparation and processing before being offered for sale to consumers. Hams, in particular, are oftentimes sliced, seasoned and/or glazed to enhance the flavor and appearance of the ham. Conventional processing methods commonly require a multi-stage process, usually utilizing multiple machines, for slicing and seasoning a ham. First, the ham is secured on a slicing machine that cuts the ham into multiple portions. For example, a spiral slicing machine may be used to cut the ham into substantially evenly-cut slices such that the meat is left attached to the flavor-preserving bone. After the ham has been sliced, it is removed from the slicing machine and moved to a seasoning or glazing machine for further flavor-enhancing processing.

Furthermore, conventional seasoning and glazing machines only apply the seasoning or glaze to the outside surface of the ham. For example, the seasoning may be brushed, poured or otherwise coated on the ham. Such a seasoning process, however, tends to apply a majority of the seasoning on the outside portions of the ham but lacks seasoning toward the middle portions of the ham, especially near the bone.

SUMMARY OF THE INVENTION

Accordingly, embodiments of the invention include meat processing apparatus and methods for seasoning meat while it is being sliced. Other embodiments of the invention include apparatus and methods for applying a more flavorful distribution of seasoning throughout a cut of meat.

One embodiment of the invention includes an apparatus for slicing and seasoning a ham. The apparatus includes a mounting portion configured to rotate a ham mounted thereon and a blade movable between a first position and a second position, wherein the blade, in the second position, is configured to engage and slice the ham as the ham is being rotated by the mounting portion. The apparatus further includes a reservoir being sized to contain a liquid seasoning and a nozzle in fluid communication with the reservoir, wherein the nozzle is aligned substantially coplanar with the blade when the blade is in the second position, the nozzle being further configured to direct a stream of liquid seasoning into the portion of the ham being sliced.

Another embodiment of the invention includes a method for processing meat. The method includes automatically slicing, with at least one blade, a non-planar surface of a piece of meat, wherein said slicing divides the piece of meat into a plurality of portions such that the blade creates an opening between the portions during the slicing. The method further includes spraying a liquid seasoning into the opening of the piece of meat, wherein the spraying is performed automatically and concurrently with said slicing. In one embodiment, the piece of meat comprises a ham. In other embodiments, the method includes spiral slicing the piece of meat.

Another embodiment of the invention includes an apparatus for processing meat. The apparatus includes a blade, a reservoir and a sprayer. The blade is configured to slice a substantially non-planar surface of a piece of meat. The reservoir is configured to hold a liquid seasoning. The sprayer is in fluid communication with the reservoir and is substantially aligned in the direction of the blade, the sprayer being configured to spray the liquid seasoning in the general direction of the blade to season the meat while the meat is being sliced. In a further embodiment, the apparatus is configured to spiral slice the meat.

Another embodiment of the invention includes a method for processing meat. The method includes automatically slicing with a blade a non-planar surface of a piece of meat, wherein the slicing divides the piece of meat such that the blade creates an opening in the meat during the slicing. The method further includes applying a seasoning in the opening of the piece of meat, wherein the applying is performed substantially concurrently with at least a portion of the slicing.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

The features of the system and method will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the invention.

The term "seasoning" as used herein is a broad term and is used in its ordinary sense and includes, without limitation, any mixture for flavoring food such as meat. For example, seasoning may be in a liquid form, a dry form or any other suitable form and may comprise one or more of the following: water, sugar, gelatin, honey, high fructose corn syrup, wheat starch, corn syrup, soy flour, paprika, dextrose, spices, natural flavorings, glazes, combinations of the same and the like. The term "season" as used herein is also a broad term and is used in its ordinary sense and includes, without limitation, the act of applying, coating, injecting, spreading, and/or wiping a seasoning on or to a particular destination.

The terms "spray, "sprayer" and "spraying" as used herein are broad terms and each is used in its ordinary sense and relates to, without limitation, any device, system or apparatus capable of applying, coating, injecting, spreading, and/or wiping a liquid or a dry substance on or to a particular destination. In one embodiment, a sprayer streams or projects liquid seasoning from a first location to a second location.

The term "non-planar" as used herein is a broad term and is used in its ordinary sense and includes, without limitation, any surface that is not substantially flat or that does not generally extend within a single plane. For example, a non-planar surface includes a substantially curved or rounded surface, a jagged surface, a surface with uniform or non-uniform bumps or protrusions, combinations of the same or the like.

Figure 1:
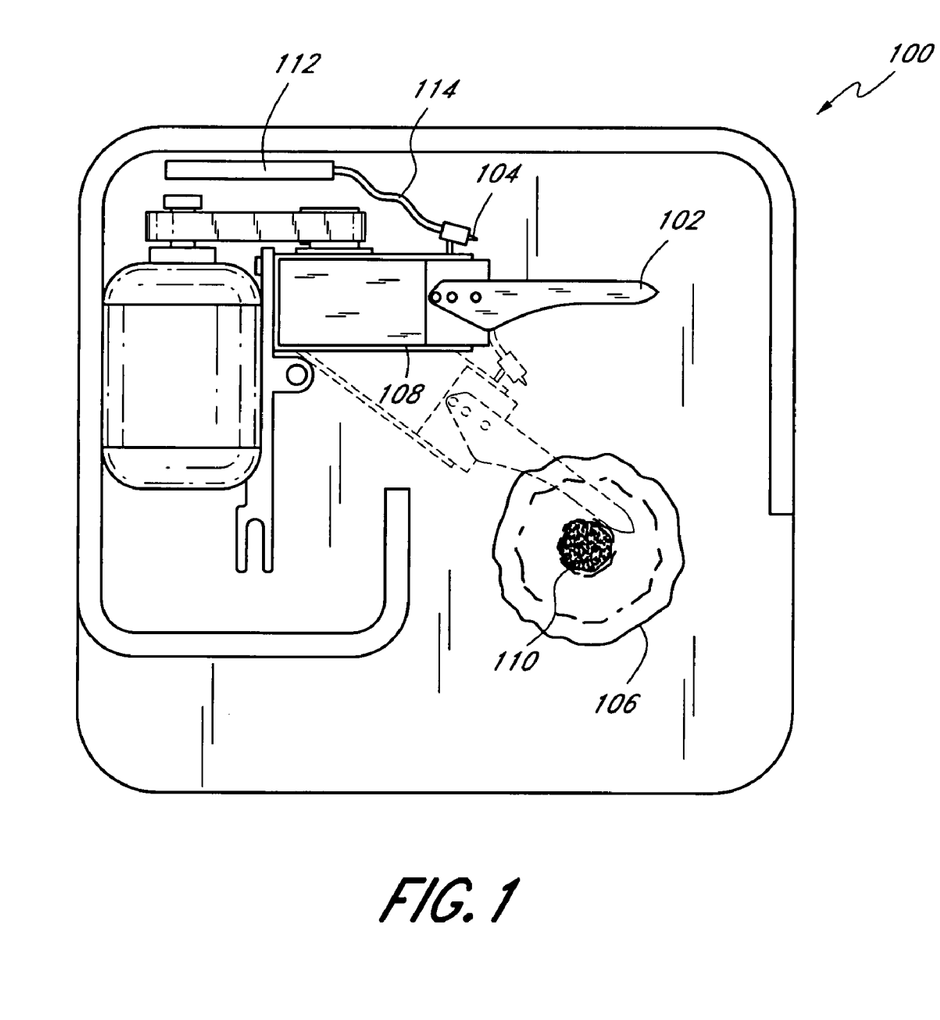
FIG. 1 illustrates a top view of a meat processing apparatus according to one embodiment of the invention.

FIG. 1 illustrates one embodiment of a meat processing apparatus 100 configured to slice and season a piece of meat. In particular, the meat processing apparatus 100 seasons the piece of meat while it is being sliced. As illustrated, the meat processing apparatus 100 includes a blade 102 for slicing the meat and a sprayer 104, in the form of a nozzle, for seasoning the meat.

For illustration purposes, the meat will be referred to herein and depicted in the figures as a ham 106, although other pieces of meat may be used with the meat processing apparatus 100. For example, embodiments of the invention may also be used with turkey, chicken, pork, beef, or the like, or other meats that are capable of being sliced in a conventional manner. The meats may include at least one bone that extends at least partially therethrough or that is located on an outside portion of the cut of meat. In other embodiments, the meat processing apparatus 100 is usable to slice boneless cuts of meat. Furthermore, the meat processing apparatus 100 may be used to slice and season a cut of meat after the meat has been substantially cooked. In other embodiments, the meat processing apparatus 100 may be used to slice and season a cut of meat prior to the meat being cooked.

As shown, the blade 102 is secured at one end to a movable support block 108. As the movable support block 108 rotates to an engaging position (as depicted by the dashed line in FIG. 1), the blade 102 engages and advantageously slices the ham 106. In one embodiment, if the blade 102 contacts a bone 110 of the ham 106, the blade 102 moves slightly outwardly away from the bone 110. When the bone 110 thins down, the blade 102 moves back toward the center of the ham 106. Such movement may be controlled, in certain embodiments, through the force of a spring or other tensioned mechanism.

In one embodiment, the blade 102 is configured to spiral slice the ham 106 such that a substantially continuous spiral slice is cut into the ham 106. For example, embodiments of the invention may utilize a spiral slicer similar to that disclosed in U.S. Pat. No. 4,050,370, entitled "SPIRAL MEAT SLICER WITH IMPROVED RECIPROCATING KNIFE STRUCTURE," which is hereby incorporated herein by reference in its entirety and is to be considered as a part of this specification. In other embodiments of the invention, the meat processing apparatus 100 may use other means for slicing meat, such as, for example, a stationary blade, a rotary blade, a serrated blade, multiple blades, combinations of the same or the like.

FIG. 1 further illustrates the meat processing apparatus 100 including the sprayer 104 for applying seasoning, such as, for example, a liquid seasoning, to the ham 106. As shown, the sprayer 104 comprises a nozzle and is coupled to the movable support block 108. In certain embodiments, the nozzle 104 is generally aligned to spray or stream liquid seasoning in the direction of the ham 106 when the support block 108 is in an engaging position. In one embodiment, the nozzle 104 provides a substantially continuous stream of liquid seasoning when seasoning the ham 106. In other embodiments, the nozzle 104 may be configured to provide the liquid seasoning in bursts or according to a predetermined or controlled duty cycle. In other embodiments, the nozzle 104 may provide the liquid seasoning in the form of a mist, a spray, or shotgun-type blasts. In yet other embodiments, the nozzle 104 may apply a dry form of the seasoning to the ham 106.

In other embodiments of the invention, the nozzle 104 may be integrated within the support block 108 such that the nozzle 104 protrudes from the outside surface of the support block 108 or is flush with the outside surface of the support block 104. In yet other embodiments, the nozzle 104 may be separate from the support block 108, such as a stand-alone device.

As shown, the nozzle 104 is in fluid communication with at least one reservoir 112 for housing seasoning. In particular, the nozzle 104 is coupled to a flexible hose 114 that conducts liquid seasoning from the reservoir 112 to the nozzle 104. The flexible hose 114 may advantageously comprise a plastic or rubber tube, such as those commonly used to transport liquids. In other embodiments, other means for transporting liquid may be used in place of, or in combination with, the flexible hose 114. For example, the nozzle 104 may be coupled to at least one reservoir 112 through a rigid tubing, such as a metal or hard-plastic tubing.

The term "reservoir" as used herein is a broad term and is used in its ordinary sense and includes, without limitation, any chamber or container usable to house seasoning, such as, for example, a liquid seasoning. For instance, a reservoir may comprise a refillable plastic container or may include a connector that couples to an external container for holding seasoning. In one embodiment, the meat processing apparatus 100 may be configured to couple through a reservoir to pre-packaged containers of liquid seasoning.

In one embodiment, the spray of liquid seasoning output by the nozzle 104 is caused by fluid pressure associated with the source of liquid seasoning. For example, the reservoir 112 may be coupled to a domestic water supply that provides the necessary water pressure to spray the liquid seasoning with the nozzle 104. In another embodiment, the domestic water supply is coupled to the nozzle 104 through a second tube, such that water from the domestic water supply is mixed with seasoning traveling through the flexible hose 114. In yet other embodiments, the meat processing apparatus 100 further includes a pump that supplies the necessary pressure to spray the liquid seasoning through the nozzle 104. In other embodiments, the nozzle 104 includes a pump, a compressor, a vacuum source or other pressure-regulation device that supplies pressure for the nozzle 104 to appropriately output the seasoning.

Figure 2:
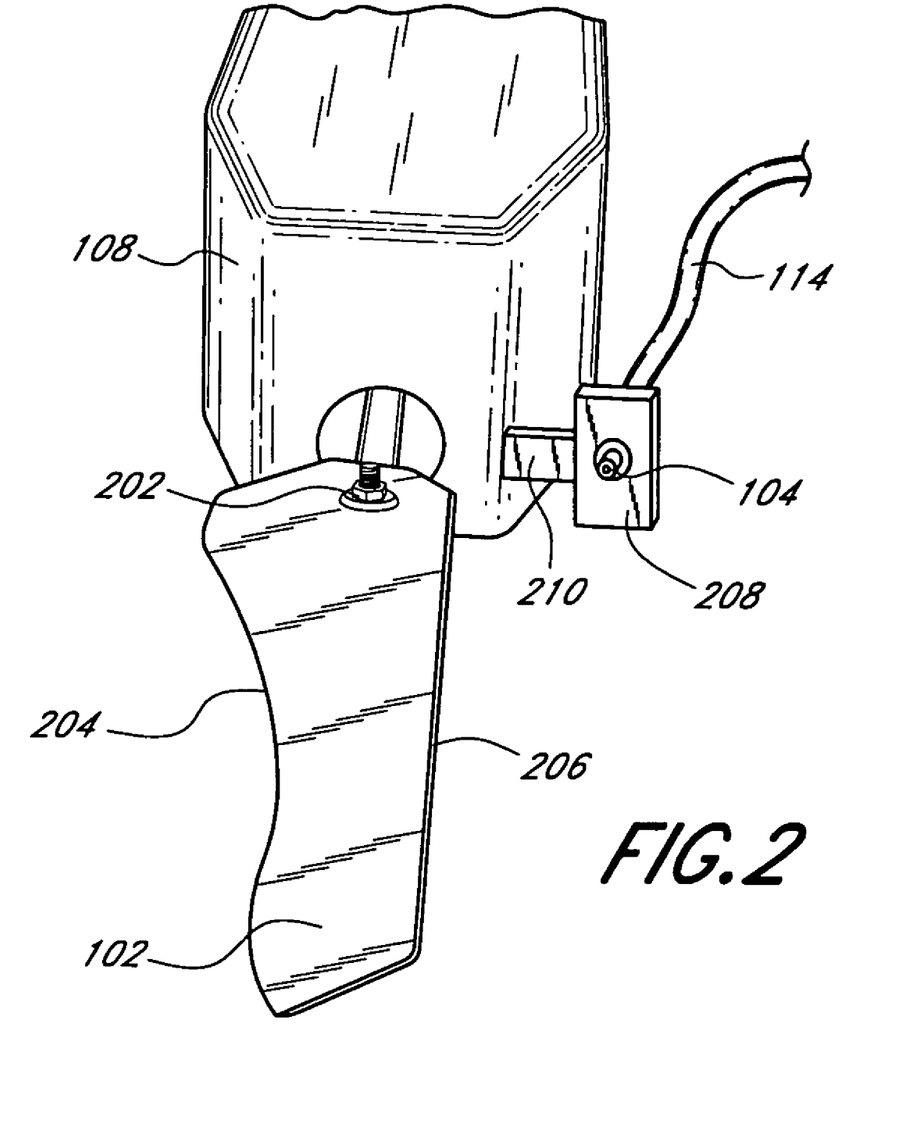
FIG. 2 illustrates a perspective view of an exemplifying embodiment of a blade and a sprayer usable with the meat processing apparatus of FIG. 1.

FIG. 2 illustrates further details of an embodiment of the blade 102 and the nozzle 104. In particular, the blade 102 is secured to the movable support block 108 by an attachment assembly 202. For example, the illustrated attachment assembly 202 includes a screw-type assembly for securing the blade 102.

The blade 102 further includes a cutting edge 204 usable to slice the ham when in contact therewith. As illustrated, the cutting edge 204 is arcuately shaped and advantageously includes a configuration that substantially complements the shape of the ham and the path of rotation thereby. The arcuate shape of the cutting edge 204 also advantageously provides for a longer cutting surface than a straight-edged knife. In yet other embodiments of the invention, the cutting edge 204 of the blade 102 may be straight, serrated, combinations of the same or the like.

The blade 102 also includes a rearward edge 206. In one embodiment, the rearward edge 206 has a greater thickness than the cutting edge 202. For example, the rearward edge 206 advantageously has a thickness of approximately one-eighth of an inch (approximately 3.2 mm). Such a design advantageously suppresses vibration of the blade 102 and facilitates slicing of the ham. In other embodiments the rearward edge 206 has a thickness between approximately one sixteenth of an inch and three sixteenths of an inch.

In one embodiment, the blade 102 is advantageously angled with respect to a level, horizontal plane, such as a plane extending substantially perpendicular to a rotational axis of the ham. In one embodiment, such an angle advantageously facilitates spiral slicing of the ham or other meats. In one embodiment, the blade 102 is angled between approximately four and six degrees upward (i.e., the cutting edge 204 being higher than the rearward edge 206) with respect to the horizontal plane. In a preferred embodiment, the blade 102 is angled at approximately four and one-half degrees upward with respect to the horizontal plane. In other embodiments, the blade 102 is not angled or the blade 102 has an adjustable angle for adaptation to a desired slicing process.

With continued reference to FIG. 2, the nozzle 104 is secured by a nozzle plate 208 coupled to the support block 108 through a brace 210. In one embodiment, the brace 210 and/or nozzle plate 208 allow for adjustment of the position or alignment of the nozzle 104. For example, the nozzle 104 may be adjusted in a vertical, horizontal, and/or diagonal direction to align a stream of liquid seasoning output therefrom. In certain embodiments, the nozzle plate 208 is in a fixed position, or the meat processing apparatus 100 may function without a nozzle plate 208. In yet other embodiments, the nozzle direction automatically adjusts to desired positions and/or angles during the slicing of the ham.

Figure 3:
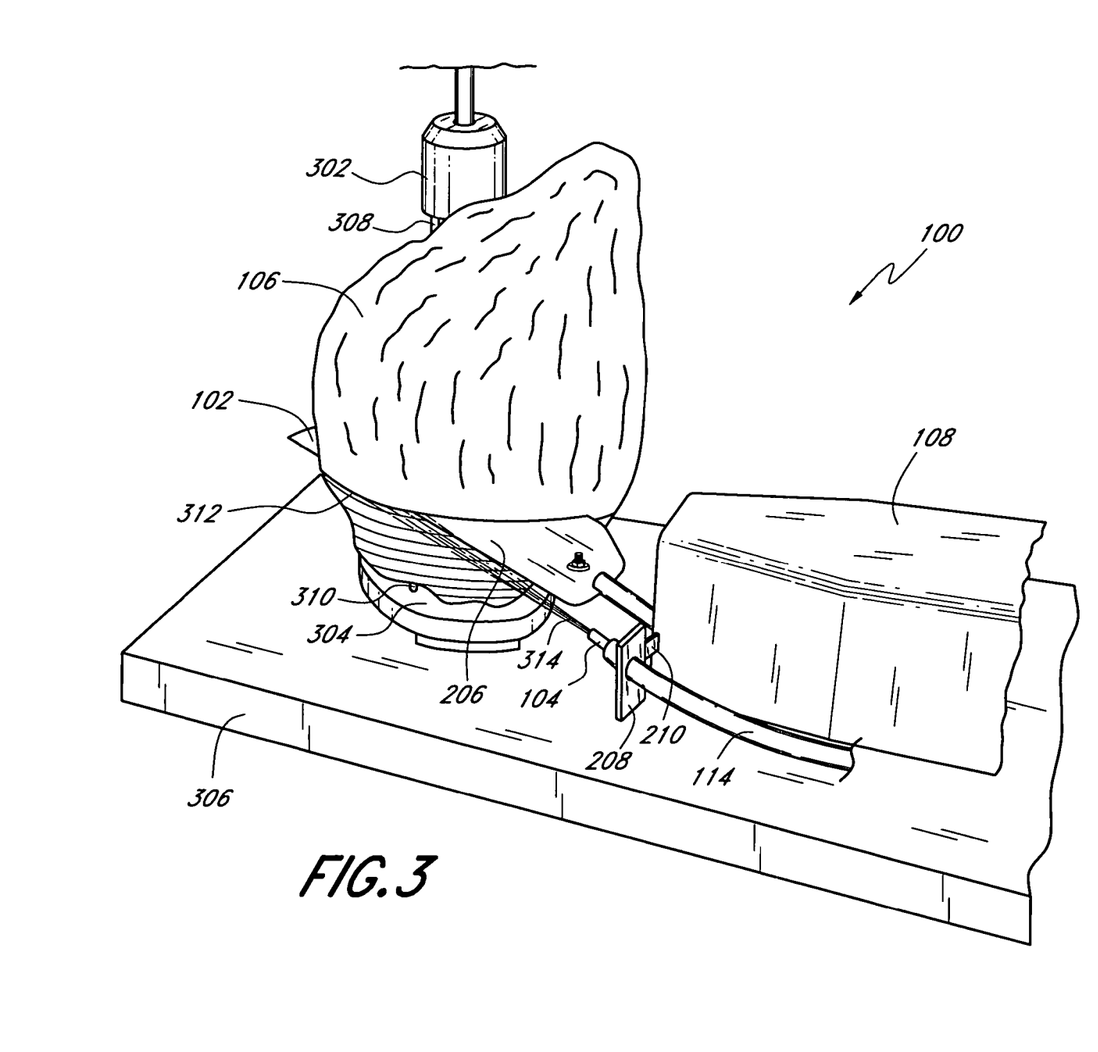
FIG. 3 illustrates a perspective view of a meat processing apparatus slicing and seasoning a ham according to one embodiment of the invention.

In one embodiment, the nozzle 104 is aligned to spray a stream of liquid seasoning to a location adjacent the rearward edge 206 of the blade 102, as is further depicted in FIG. 3. In particular, FIG. 3 illustrates the meat processing apparatus 100 slicing and seasoning the ham 106. As shown, the ham 106 is secured between a rotatable upper prong structure 302 and a lower plate 304, which is advantageously rotatable with respect to a base portion 306. In one embodiment, the ham 106 is placed between the upper prong structure 302 and the lower plate 304 such that a butt end of the ham 106 rests on the lower plate 304 and the (leg) bone is positioned upright, thereby forming a substantially vertical axis of rotation for the ham 106. The upper prong structure 302 advantageously includes at least one securing prong 308 for insertion into the shank end of the ham 106. The lower plate 304 advantageously includes at least one securing prong 310 for insertion into the butt portion of the ham 106.

With respect to the operation of the meat processing apparatus 100, in one embodiment, the ham 106 is advantageously rotated by the prong structure 302 and the lower plate 304. The blade 102 is brought into contact with the ham 106 through automatic or manual movement of the support block 108 into an engaging position. As the ham 106 rotates, the support block 108 slowly moves the blade 102 in an upward, substantially vertical direction. Such movement provides for a spiral, or helical, slice of the ham 106.

Furthermore, as the blade 102 slices the ham 106, the angle of the blade 102 creates an opening 312 in the ham 106. This opening 312 advantageously allows for seasoning of the ham 106 throughout the cut of the ham 106, especially in between portions of the ham 106 near the bone. In other embodiments, the shape, thickness, movement and/or vibration of the blade 102 may be modified to create, or regulate the size of, the desired opening 312 in the ham 106. For example, the thickness of the rearward edge 206 of the blade 102 may be increased to create a larger opening in the ham 106.

As further illustrated in FIG. 3, the nozzle 104 directs a stream 314 of liquid seasoning into the opening 312, such as toward the rearward edge 206 of the blade 102. In one embodiment, the nozzle 104 and stream 314 are substantially coplanar with the top surface of the blade 102. Such alignment of the nozzle 104 and the stream 314 advantageously provides for seasoning of internal portions of the ham 106, such as in between meat portions of the ham 106. In one embodiment, such a seasoning process advantageously provides for a more flavorful product because the liquid seasoning is distributed between each slice throughout the ham 106.

In other embodiments, the ham 106 is not rotated during the slicing and seasoning process. For example, the ham 106 may be kept substantially stationary while the blade 102 is moved around the ham 106. In other embodiments, the ham 106 is moved vertically during the slicing process such that multiple slices may be made in the ham 106. In yet other embodiments, the ham 106 may be placed between vertical support structures such that a rotational axis of the ham 106 extends in approximately a horizontal direction. In yet further embodiments, the meat processing apparatus 100 comprises multiple blades 102 for slicing the ham.

Although the meat processing apparatus 100 is described with reference to particular embodiments, alternative structures and/or devices are usable to secure and/or rotate a piece of meat while the meat is being sliced and seasoned. For example, the meat processing apparatus 100 may include only one of the rotatable upper prong structure 302 and the lower plate 304 for securing the meat. In other embodiments, the meat processing apparatus 100 may include other devices for securing meat, such as for example, clamps, elongated spikes or pins, skewers, combinations of the same and the like.

Furthermore, in certain embodiments of the invention, the meat processing apparatus 100 is capable of slicing a substantially boneless piece of meat. For example, at least the one of the rotatable upper prong structure 302 and the lower plate 304 may be used to secure the meat. In yet other embodiments, the meat processing apparatus 100 further includes an elongated skewer or pin usable to pierce the boneless piece of meat and rotate the meat while the meat is being sliced and seasoned.

In yet other embodiments, the nozzle 104 directs the stream 314 of liquid seasoning from other directions with respect to the blade 102. For example, the nozzle 104 may be positioned on an opposite side of the ham 106 in relation to the blade 102. In other embodiments, the nozzle 104 may direct the stream 314 in a direction substantially perpendicular to the rearward edge 206 of the blade 102.

Figure 4:
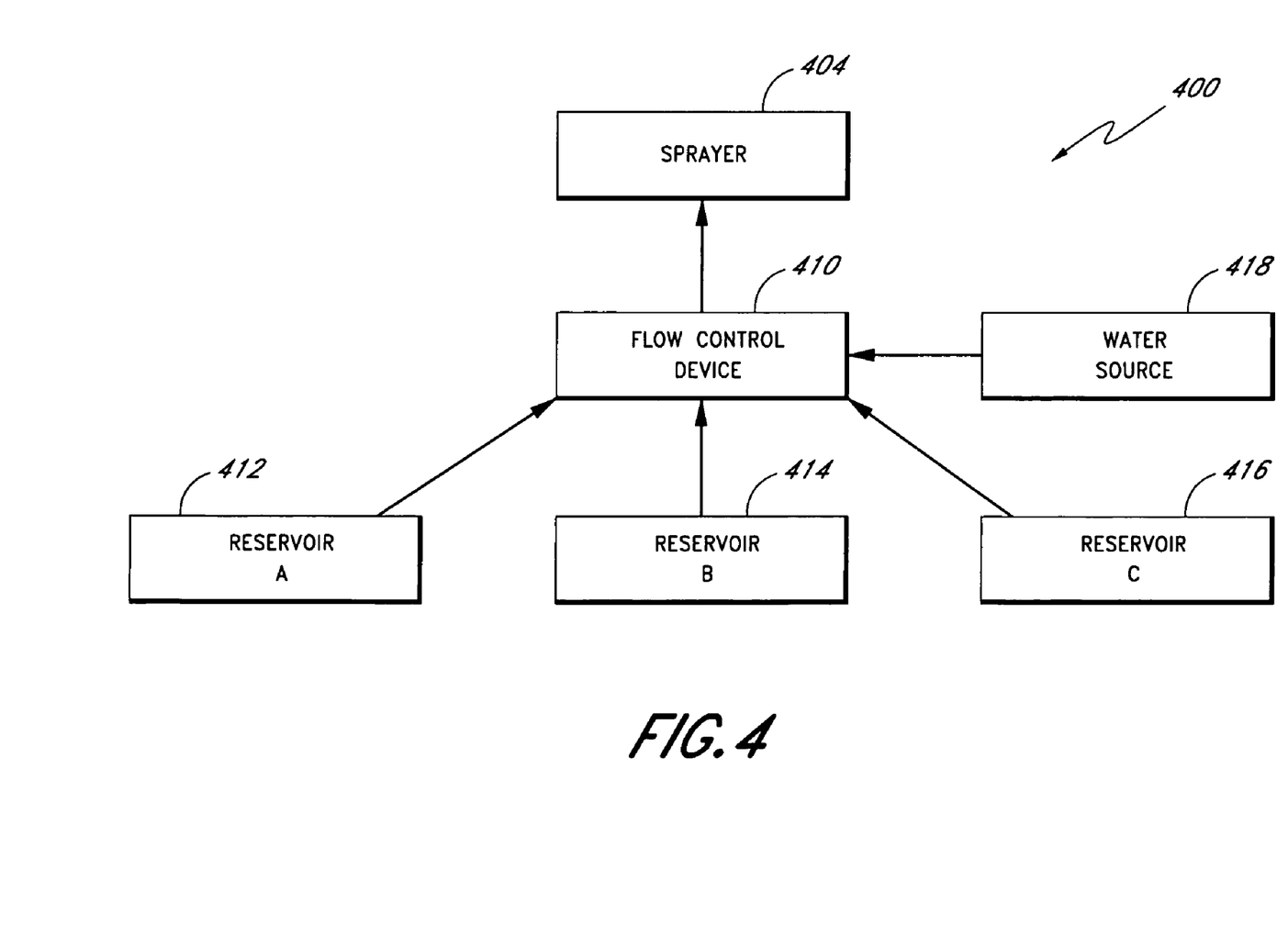
FIG. 4 illustrates a system diagram of a meat processing apparatus according to one embodiment of the invention.

FIG. 4 illustrates an exemplifying embodiment of a control system 400 for the seasoning subsystem of a meat processing apparatus having multiple sources of liquid seasoning. The control system 400 includes at least one sprayer 404, such as, for example, the nozzle 104 depicted in FIGS. 1–3. In other embodiments, the control system 400 may comprise a plurality of sprayers equal in number to a plurality of liquid seasonings selectable to be applied to the ham 106.

As shown, the sprayer 404 communicates with a flow control device 410. In one embodiment, the flow control device 410 selects between one or more seasonings to be provided to the sprayer 404. In one embodiment, the flow control device 410 combines or mixes multiple liquids to be provided concurrently to the same sprayer 404. For example, the flow control device 410 may combine a domestic water supply with one or more liquid seasonings to be applied to the meat. In other embodiments, the flow control device 410 selects between multiple sprayers 404.

In one embodiment, the flow control device 410 may comprise a T- or Y-connector that combines two channels or sources into a single channel or source. In yet other embodiments, the flow control device 410 may comprise other types of connectors usable to couple more than two sources to a single source. The flow control device 410 may be electronically controlled through input from a user and/or by a preprogrammed process, or the flow control device 410 may comprise manual controls selectable to switch between, or control, the application of different liquid seasonings. For example, in one embodiment, the flow control device 410 may comprise one or more valves and/or switches.

FIG. 4 further illustrates the flow control device 410 coupled to multiple reservoirs sized to hold liquid seasonings. In particular, the flow control device 410 communicates with a Reservoir A 412, a Reservoir B 414 and a Reservoir C 416. The flow control device 410 also communicates with a water source 418. In one embodiment, the water source 418 is a domestic water source, such as is provided from a faucet or a standard water line or pipe.

Although described with reference to particular embodiments, the control system 400 may comprise fewer or more components than depicted in FIG. 4. For example, control system 400 may operate without a water source 418 and/or one or more of the reservoirs 412, 414, and 416. In another embodiment, additional reservoirs may be used, or the control system 400 may further comprise a pump that generates the pressure for streaming liquid seasoning with the sprayers 404. Furthermore, the control system 400 may comprise multiple flow control devices 410 usable to select between and/or combine the various liquid seasonings and the water source.

Figure 5:
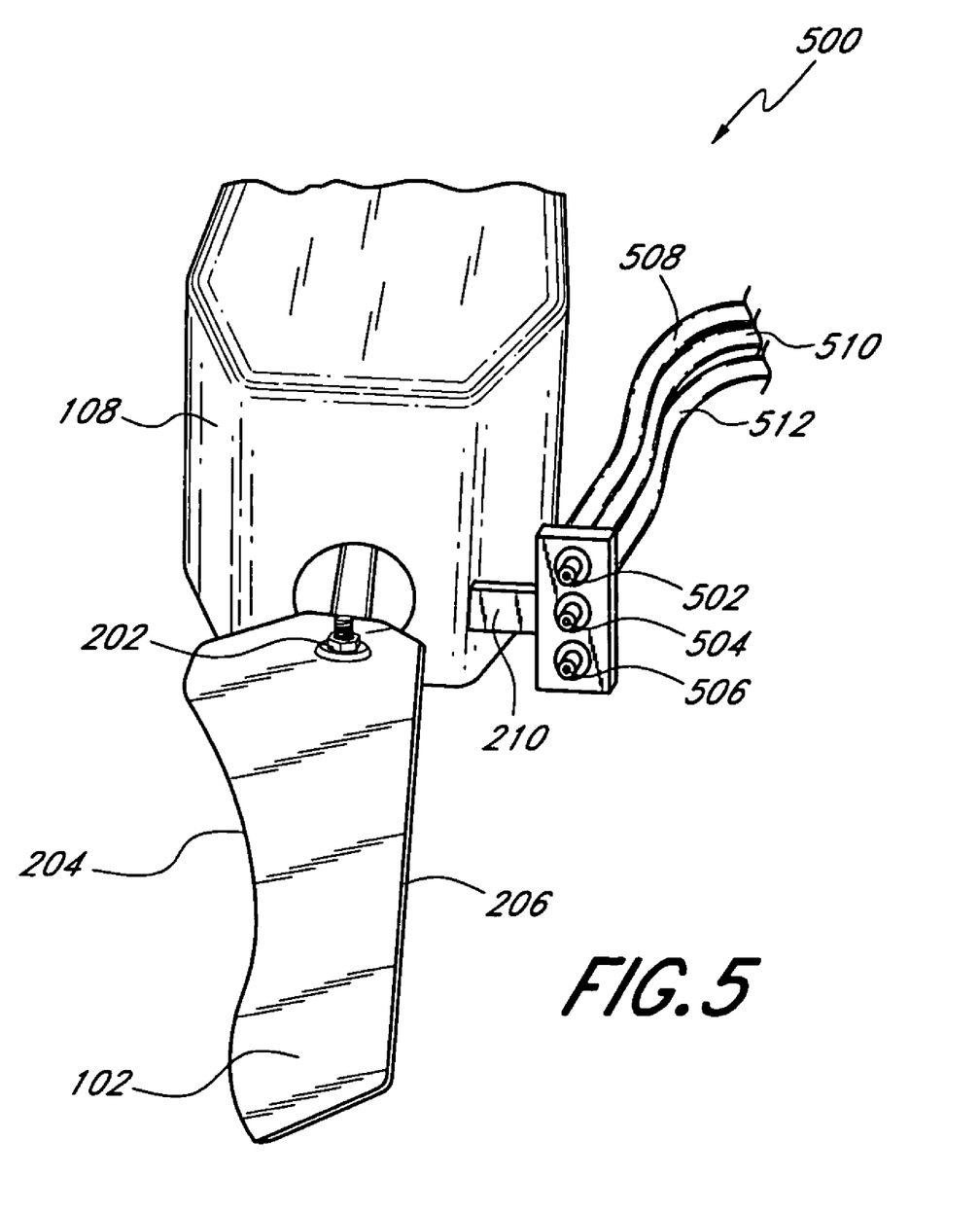
FIG. 5 illustrates a perspective view of an exemplifying embodiment of a meat processing apparatus having multiple sprayers.

FIG. 5 illustrates an embodiment of a meat processing apparatus 500 having multiple nozzles for applying seasonings. The meat processing apparatus 500 includes a first nozzle 502, a second nozzle 504 and a third nozzle 506 coupled to a first hose 508, a second hose 510 and a third hose 512, respectively. Such an embodiment allows for dedicated nozzles and/or hoses for particular types of seasonings and avoids cross-contamination between different seasonings. Furthermore, because the viscosity between liquid seasonings may vary, the nozzles, hoses and/or associated pumps may be configured to adjust the fluid pressure associated with a particular liquid seasoning such that the desired output stream from the nozzle(s) is obtained.

In one embodiment, the nozzles 502, 504, 506 are each oriented to spray a stream of liquid seasoning to substantially the same location. For example, the nozzle 504 may be oriented in a substantially horizontal direction, while the nozzle 502 is oriented slightly downwards and the nozzle 506 is oriented slightly upwards. In other embodiments, the nozzles may be configured to stream liquid seasonings concurrently or at alternate times.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for slicing and seasoning a ham, the apparatus comprising:
   a mounting portion configured to rotate a ham mounted thereon;
   a blade movable between a first position and a second position, wherein the blade, in the second position, is configured to engage and slice the ham as the ham is being rotated by the mounting portion, the ham remaining intact during and after the slicing process with two adjacent slices remaining substantially parallel to one another, and wherein the blade is angled and comprises a thickened portion such that the blade causes an opening between adjacent slices of the ham;
   a reservoir being sized to contain a liquid seasoning; and
   a nozzle in fluid communication with the reservoir, wherein the nozzle is aligned substantially coplanar with the blade when the blade is in the second position, the nozzle being further configured to direct a stream of liquid seasoning into the opening between adjacent slices of the ham.

2. The apparatus of claim 1, further comprising a second reservoir being sized to contain a second liquid seasoning, wherein the second reservoir is in further fluid communication with the nozzle.

3. The apparatus of claim 1, further comprising a movable support block, wherein the blade and the nozzle are both coupled to the movable support block.

4. The apparatus of claim 1, wherein the blade is angled between approximately four and six degrees with respect to a plane extending substantially perpendicular to a rotational axis of the mounting portion.

5. A method for processing meat, the method comprising:
   automatically slicing, with at least one blade, a non-planar surface of a piece of meat having a bone extending substantially therethrough, wherein said slicing divides the piece of meat into a plurality of adjacent portions such that at least two of the plurality of adjacent remain attached to the bone, and wherein the blade creates an opening between the adjacent portions during said slicing; and
   spraying a liquid seasoning into the opening between the adjacent portions of the piece of meat, wherein said spraying is performed automatically and concurrently with said slicing.

6. The method of claim 5, wherein said slicing comprises spiral slicing the piece of meat.

7. The method of claim 5, additionally comprising rotating the piece of meat during said slicing and said spraying.

8. The method of claim 5, additionally comprising mixing the liquid seasoning with a domestic water source prior to said spraying.

9. The method of claim 5, wherein the liquid seasoning comprises at least one of: water, sugar, gelatin, honey, corn syrup, a spice, a glaze and a natural flavoring.

10. The method of claim 5, wherein the piece of meat is a ham.

11. An apparatus for processing meat, the apparatus comprising:
    a movable blade configured to slice a piece of meat into a plurality of slices as the meat is rotated such the plurality of slices remain substantially adjacent to each other attached together, the blade having an angle configured to cause an opening between the adjacent slices of the piece of meat;
    a reservoir configured to hold a seasoning; and
    a sprayer in fluid communication with the reservoir, wherein the sprayer is configured to move with the movable blade and to spray the seasoning generally into the opening to season the meat.

12. The apparatus of claim 11, further comprising a rotatable mount configured to rotate the piece of meat while the meat is being sliced and seasoned.

13. The apparatus of claim 12, wherein the blade is angled between approximately four degrees and approximately six degrees with respect to a plane substantially perpendicular to an axis of rotation of the piece of meat.

14. The apparatus of claim 13, wherein the blade is angled at approximately four and one-half degrees with respect to the plane substantially perpendicular to the axis of rotation of the piece of meat.

15. The apparatus of claim 11, further comprising a flow control device between the reservoir and the sprayer, wherein the flow control device is configured to control the flow of seasoning to the sprayer.

16. The apparatus of claim 11, wherein the sprayer comprises a nozzle.

17. The apparatus of claim 11, wherein the sprayer is in fluid communication with a water source.

18. The apparatus of claim 11, wherein the blade comprises an elongated knife.

19. The apparatus of claim 18, wherein the elongated knife comprises a reciprocating knife.

20. A method for processing meat, the method comprising:
    automatically slicing as it is rotated a piece of meat such that the meat continues to remain substantially attached together, wherein said slicing divides the piece of meat into adjacent slices;
    creating an opening between adjacent slices of the meat during said slicing; and
    applying a seasoning in the opening between adjacent slices of the piece of meat.

21. The method of claim 20, wherein said applying is performed substantially concurrently with at least a portion of said slicing.

22. The apparatus of claim 11, wherein the blade has a thickened portion configured to cause the opening.

23. The apparatus of claim 11, wherein the seasoning is sprayed into the opening generally while the adjacent slices are being sliced.

* * * * *

UNITED STATES PATENT AND TRADEMARK OFFICE
CERTIFICATE OF CORRECTION

| | | |
|---|---|---|
| PATENT NO. | : 7,070,824 B1 | Page 1 of 1 |
| APPLICATION NO. | : 11/091318 | |
| DATED | : July 4, 2006 | |
| INVENTOR(S) | : Richard E. Gore | |

It is certified that error appears in the above-identified patent and that said Letters Patent is hereby corrected as shown below:

Column 8, line 50, in Claim 5, delete "adjacent" and insert therefore, -- adjacent portions --.

Column 9, line 6, in Claim 11, delete "such" and insert therefore, -- such that --.

Signed and Sealed this

Twenty-sixth Day of December, 2006

JON W. DUDAS
*Director of the United States Patent and Trademark Office*